United States Patent
Smith

(10) Patent No.: US 9,050,992 B2
(45) Date of Patent: Jun. 9, 2015

(54) PORTABLE WORK STATION

(71) Applicant: Michael Smith, Louisville, KY (US)

(72) Inventor: Michael Smith, Louisville, KY (US)

( * ) Notice: Subject to any disclaimer, the term of this patent is extended or adjusted under 35 U.S.C. 154(b) by 0 days.

(21) Appl. No.: 13/646,802

(22) Filed: Oct. 8, 2012

(65) Prior Publication Data

US 2013/0118818 A1    May 16, 2013

Related U.S. Application Data

(60) Provisional application No. 61/559,353, filed on Nov. 14, 2011.

(51) Int. Cl.
| | | |
|---|---|---|
| *B62B 1/26* | (2006.01) | |
| *B62D 51/04* | (2006.01) | |
| *B62B 1/12* | (2006.01) | |
| *B25H 1/04* | (2006.01) | |
| *B25H 3/02* | (2006.01) | |

(52) U.S. Cl.
CPC .. *B62B 1/12* (2013.01); *B25H 1/04* (2013.01); *B25H 3/02* (2013.01); *B62B 2202/48* (2013.01); *B62B 2206/006* (2013.01)

(58) Field of Classification Search
CPC ........ B62B 1/008; B62B 1/042; B62D 51/04; B25H 1/04; B25H 3/02
USPC .......... 180/19.1; 280/30, 43.1, 47.131, 47.17, 280/47.19, 47.24, 47.26, 47.315, 655.1; 190/39, 115

See application file for complete search history.

(56) References Cited

U.S. PATENT DOCUMENTS

| | | | |
|---|---|---|---|
| 3,711,110 A | | 1/1973 | Logerquist |
| 4,284,286 A * | | 8/1981 | Lewallen .................. 280/30 |
| 4,565,382 A * | | 1/1986 | Sherman ................ 280/47.18 |
| 5,257,892 A * | | 11/1993 | Branch .................. 280/47.18 |
| 6,170,839 B1 | | 1/2001 | Kizewski |
| 6,328,319 B1 * | | 12/2001 | Stahler, Sr. ............. 280/47.18 |
| 6,761,366 B1 | | 7/2004 | Klemmensen |
| 7,367,571 B1 | | 5/2008 | Nichols |
| 7,503,569 B2 | | 3/2009 | Duvigneau |
| 7,571,915 B1 | | 8/2009 | Simmons |
| 2009/0314555 A1 * | | 12/2009 | Meyers ................... 180/19.1 |
| 2010/0290877 A1 * | | 11/2010 | Landau et al. ............ 414/490 |
| 2012/0326406 A1 * | | 12/2012 | Lifshitz et al. .......... 280/47.19 |

* cited by examiner

*Primary Examiner* — Joseph Rocca
*Assistant Examiner* — Jacob Knutson
(74) *Attorney, Agent, or Firm* — Daniel Boudwin; Global Intellectual Property Agency LLC

(57) ABSTRACT

Disclosed is a combination portable tool chest and work station, comprising a hand truck having a pair of upper and lower folding legs, a planar work surface, and a removably attached tool chest. The hand truck can be used to transport tools and equipment to a desired location. Once the device has been placed at a desired location, the upper and lower legs can be extended, which provides a horizontal work station for performing a variety of tasks thereon. In this position, a user has access to the tool chest, and can organize various tools or work pieces on the work station. The user can then unlock the tool chest, and exchange it for a different one. When work is complete, the tool chest can be locked, the upper and lower legs can be folded, and the device can be transported via the wheels.

18 Claims, 6 Drawing Sheets

PORTABLE WORK STATION

CROSS REFERENCE TO RELATED APPLICATION

This application claims the benefit of U.S. Provisional Application No. 61/559,353 filed on Nov. 11, 2011, entitled "Porta Work Station." The above identified patent application is herein incorporated by reference in its entirety to provide continuity of disclosure.

BACKGROUND OF THE INVENTION

1. Field of the Invention

The present invention relates to a portable tool chest. More specifically, it relates to a combination portable tool chest and work station.

Many people have jobs that require the transportation of heavy tools and equipment from location to location. This often requires the use of multiple toolboxes that are each filled with various tools that have to be carried one at a time. Users will generally create task specific toolboxes in order to better organize the devices contained therein. These toolboxes are often organized by tool type, which has the additional benefit of enabling a user to select only the required toolbox for a given job. This prevents the user from carrying multiple boxes if the tools required therein are unnecessary.

The problem with this type or organizational system, however, is that it can be difficult to predict exactly what tool may be required for a particular job. If the required tool is not in the toolbox at hand, the user may have to return to his or her truck to locate additional tools, or may even have to leave the worksite in order to find the required devices if they were left behind. Situations such as this waste both time and money for the worker and those involved.

A further difficulty that is often experienced with carrying multiple toolboxes is the required time it takes to keep each box organized. It is far easier for a user to simply throw tools into a toolbox for later sorting, particularly when a user has completed his or her work for the day and wishes to get home as quickly as possible. In situations such as this, a user may place his or her tools in the closest toolbox available, or even into a bucket or other type of container. This requires the user to spend time reorganizing the toolboxes in order to ensure that each tool is in its proper location. If a user does not find time to reorganize each box, he or she may be forced to carry each toolbox to a worksite since it is impossible to determine where each tool is located.

In some trades, vehicles are utilized with built-in storage compartments for various types of tools. Vehicles such as commercial vans and trucks may include shelving or other types of areas for storing and organizing tools. This type of storage system requires that a user load the required tools for a particular job into a secondary tool storage container, or alternately, that the user carry tools from the vehicle to the worksite one at a time. Carrying individual tools makes a user prone to misplacing tools, or leaving them behind on the job.

An alternative to carrying individual toolboxes is to carry a rolling toolbox that is large enough to hold all of the tools a user may require for a job. Such devices resemble a large storage container with wheels and multiple bins. A user can place many tools therein and roll the container from site to site. Containers such as these, however, do not provide a user with a means for properly organizing his or her tools. When a particular tool is needed, a user must rummage through the bin in order to find what he or she is looking for. This can be particularly dangerous when there are sharp tools, such as knives and saws contained therein.

An additional problem faced by workers at a remote location is the lack of an available work station. Many jobs require a user to assemble, disassemble, or modify a work piece onsite, which may require a work station. In such situations, the user can transport and set up a work station. This, however, adds time and energy to move not only the required tools, but also requires transporting a work area. Alternately, a user may attempt to create a makeshift work station, however, such methods may prove unreliable, particularly when working in an unfamiliar location. If a suitable area cannot be located, the ground or an area in a work vehicle may have to be utilized for a given project.

The present invention provides a means of storing and transporting tools and equipment to a desired location, using a tool chest with multiple slide out drawers that securely hold the tools stored therein. The tool chest is mounted to a hand truck having folding legs, and can be detached from the hand truck and replaced with a variety of tool chests, allowing for customization of the device. By providing a means of storing and transporting tools and equipment, a user can quickly set up a portable work station at a remote location, saving both time and money.

2. Description of the Prior Art

Devices have been disclosed in the prior art that relate to portable tool chests. These include devices that have been patented and published in patent application publications. These devices generally relate to tool chests. The forgoing is a list of devices deemed most relevant to the present disclosure, which are herein described for the purposes of highlighting and differentiating the unique aspects of the present invention, and further highlighting the drawbacks existing in the prior art.

Kizewski, U.S. Pat. No. 6,170,839 discloses a tool cart that includes a tool chest, a convertible hand truck, a tool box, an extension cord reel, and a side storage bag. The tool chest has a plurality of drawers and is securely fastened to the convertible hand truck. This device, however, does not include folding legs that allow the device to be converted into a work station, or allow for the detachment of the tool chest for replacement with different tool chests.

Nichols, U.S. Pat. No. 7,367,571, discloses a machine tool stand, workbench, and modular task box system that are combined into an integrated system. The device further includes a support structure having a base on wheels and side rails disposed on the surface of the support base. The side rails include structures for attaching tool holders, a work piece holder, work surfaces, and the like. This device, however, provides a fold-out work area that is broken up into multiple sections when the hand truck is in a vertical position, and does not include foldable legs that enable the hand truck to be positioned horizontally for use as a work station. The present invention provides a continuous work surface that can support heavy and large loads.

Logerquist, U.S. Pat. No. 3,711,110, discloses a two-wheel truck movably mounted on a tool box to facilitate movement of the tool box over the surface. The truck has side frame members pivotally connected to the sides of the box. Wheels are rotatably mounted on the lower end of the frame members. This device, however, is not mounted on a hand truck, but instead utilizes a pair of wheels and a handle on the end of the tool box. In addition, the device cannot be detached from the wheels for replacement with different tool chests.

Simmons, U.S. Pat. No. 7,571,915, discloses a wheel-mounted tool chest configured to keep tools in place even if the wheel-mounted tool chest is turned upside down and back upright. The tool chest includes a lid, a handle, and wheels attached to a box having a T-shape profile. The box may include socket trays and may be divided into compartments. This device, however, resembles a storage container attached to a set of wheels with a telescoping handle. The '915 patent does not, however, include a hand truck or a detachable tool chest.

Klemmensen, U.S. Pat. No. 6,761,366, discloses a portable tool container comprising a molded tub and removable cover with wheels attached to one side of the container on opposite sides of a telescoping handle in a housing that is integrally molded into the container. Similar to the '915 patent, this device resembles a storage container attached to a set of wheels with a telescoping handle, and does not include a hand truck, or a detachable tool chest.

Duvigneau, U.S. Pat. No. 7,503,569, discloses a wheeled cabinet assembly comprising a wheeled base cabinet fitted with a locomoting handle, and at least one detachable container made from a pliable material and designed as an independent carrying bag wherein a base portion of the carrying bag is attachable over a top edge of the base cabinet at an upright position. This device, however, does not provide a suitable work station, or a hand truck with folding legs.

The devices disclosed in the prior art provide rolling tool boxes that enable a user to quickly transport tools and equipment to a remote location. The primary function of such devices is to store and transport the needed items for a given task. These devices, however, do not utilize a hand truck with fold out legs that allows for conversion into a work surface. Additionally, while several of the prior art devices provide a work surface, this area is not suitable for larger and heavy objects to be placed thereon. In addition, these prior art devices do not provide a means for detaching the tool chest for use of a different tool box or organizer. The present invention enables a user to transport tools and equipment, can be converted into a portable work station, and allows for the detachment of the tool chest, thereby providing a convenient solution for work at a remote location.

In light of the prior art and the disclosed elements of the present invention, it is submitted that the present invention substantially diverges in design elements from the prior art. Consequently, it is clear that that present invention is not described by the art and that a need exists for an improved combination portable tool chest and work station. In this regard, the instant invention substantially fulfills these needs.

SUMMARY OF THE INVENTION

In view of the foregoing disadvantages inherent in the known types of combination portable tool chests and work stations now present in the prior art, the present invention provides a new combination portable tool chest and work station wherein the same can be utilized for providing convenience for the user when carrying tools and equipment to a remote location, and providing a work station in the remote location.

It is therefore an object of the present invention to provide a new and improved combination portable tool chest and work station device that has all of the advantages of the prior art and none of the disadvantages.

It is another object of the present invention to provide a combination portable tool chest and work station that can transport tools and equipment to a remote location.

Another object of the present invention is to provide a combination portable tool chest and work station that allows for storage and organization of a large quantity of tools.

Yet another object of the present invention is to provide a combination portable tool chest and work station that utilizes a tool chest that is removably attached to a hand truck.

Another object of the present invention is to provide a combination portable tool chest and work station that includes folding legs on the hand truck that allows for conversion into a work station.

A final object of the present invention is to provide a combination portable tool chest and work station that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
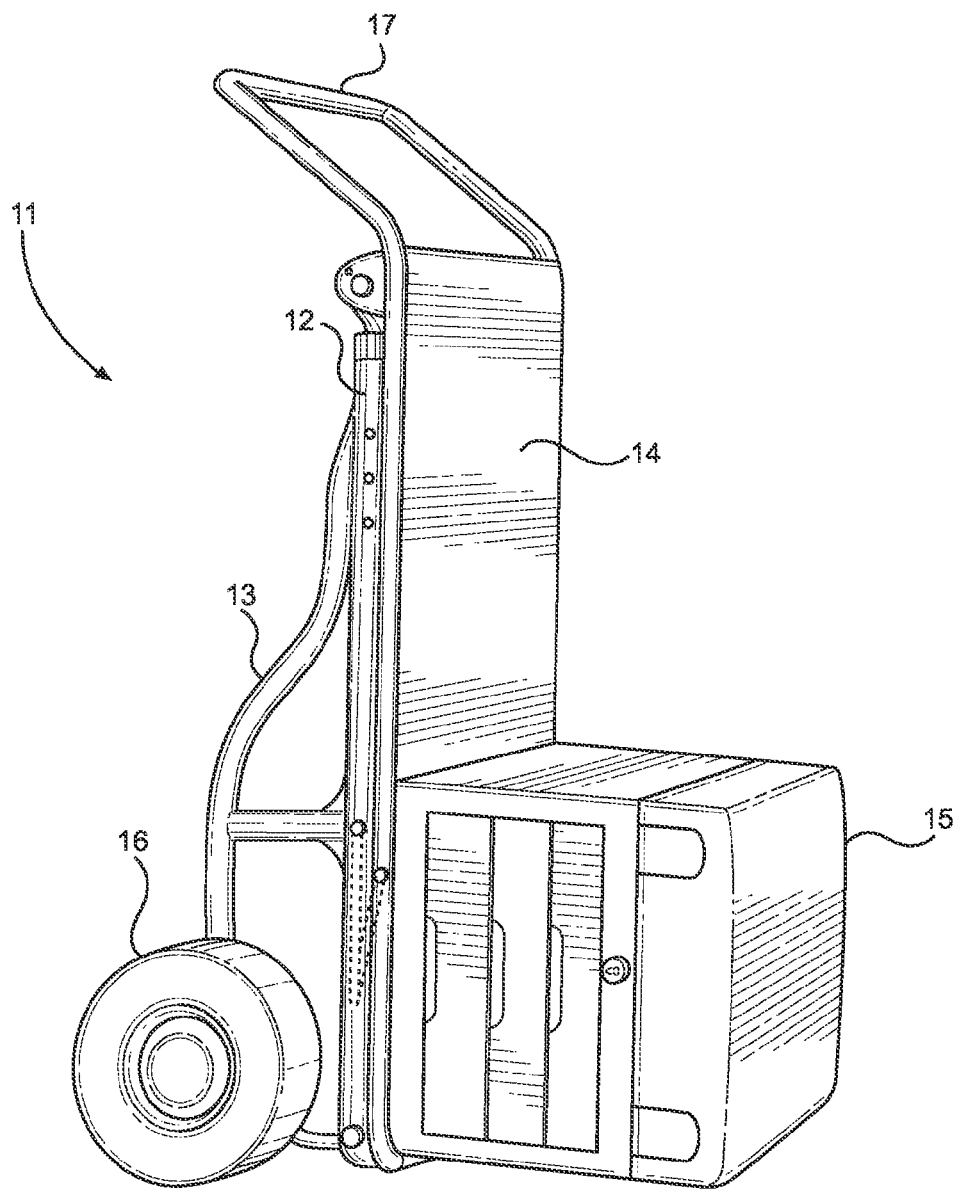
FIG. 1 shows a prospective side angle view of the present invention with a tool chest attached thereto.

Reference is made herein to the attached drawings. Like reference numerals are used throughout the drawings to depict like or similar elements of the combination portable tool chest and work station. For the purposes of presenting a brief and clear description of the present invention, the preferred embodiment will be discussed as used for transporting tools and materials, and for providing a work station at a remote location. The figures are intended for representative purposes only and should not be considered to be limiting in any respect.

Referring now to FIG. 1, there is shown a prospective side angle view of the present invention, which comprises of a hand truck 11, and an attached locking tool chest 15. The hand truck 11 allows a user to transport tools and equipment that is contained therein to a remote location. The hand truck 11 further comprises a pair of wheels 16, an upper pair of locking legs 12, a lower pair of locking legs 13, and a work space 14. Once the device has been placed at a desired location, the upper and lower legs 12, 13 can be extended, which provides a horizontal work station 14 for performing a variety of tasks thereon. In this position, a user has access to the tool chest 15, and can organize various tools or work pieces on the work station 14. Additionally, the user can unlock the tool chest 15 from the hand truck 11, and exchange it for a different tool chest. When work is complete, the tool chest 15 can be locked, the upper and lower legs 12, 13 can be locked into a folded position, and the device can be transported via the wheels 16.

The present invention utilizes a hand truck 11 style dolly as a support base for the tool chest 15. The hand truck 11 includes a frame with a handle 17 on the upper end, and a pair of wheels 16. In a conventional hand truck, a small ledge is used for placing objects thereon when the hand truck is in an upright position. In the present invention, however, the portion of the hand truck having the ledge is replaced by a tool chest 15 attached thereto. The device can be tilted backward until the weight from the tool chest 15 is balanced over the wheels 16, thereby creating a first-class lever. This positions the fulcrum in the middle of the hand truck, with effort being applied on the handle side of the hand truck 11, and the resistance on the other side thereof.

The hand truck 11 further includes a work surface between the handle 17 and tool chest 15 and attached to the frame, thereby providing a work space 14. Conventional hand trucks generally include a set of tubular rails for the stacking of objects below the handle. This design, however, enables objects to fall therethrough, particularly when small objects are placed thereon. The work space 14, however, provides a solid surface which can be utilized for the stacking of objects when the hand truck 11 is being used for transportation, and can additionally be utilized for a horizontal work surface when the hand truck 11 is converted into a work station. The planar surface of the work space 14 can be constructed from high-impact plastic, steel, aluminum, or another similar material.

The wheels 16 are large enough to support the weight of the hand truck 11, tool chest 15, and any other cargo that is supported thereby. Preferably, the wheels 16 are formed of solid rubber, foam-filled rubber, or pneumatic tires. This design additionally enables the wheels 16 to be used over a variety of surfaces. The wheels 16 are attached to the base of the hand truck 11 with an axle that enables independent rotation of each wheel 16. The axle is covered by a tubular frame section that can be used to tilt the hand truck 11 for transport. A user can place his or her foot on the tubular frame, grasp the handle 17, and tilt the device back. This transfers the weight of the tool chest 15 over the center of the wheels 16 for ease of transport.

Figure 2:
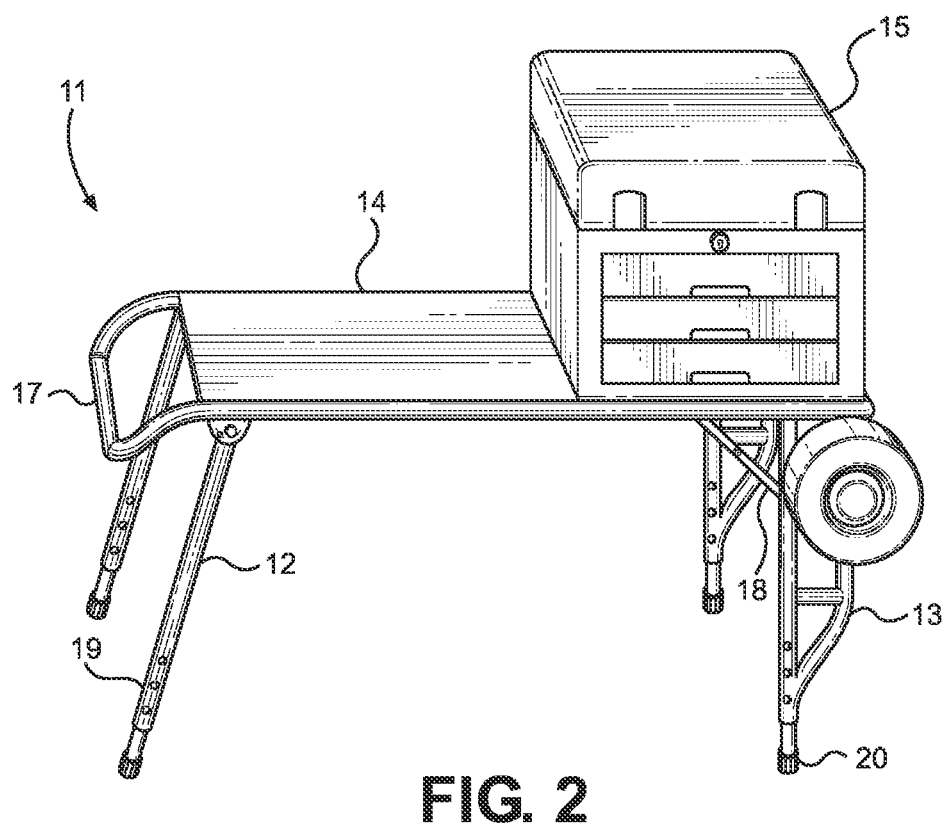
FIG. 2 shows a view of the present invention with the legs extended in order to provide a work station.

Referring now to FIG. 2, there is shown a view of the present invention with the legs extended in order to provide a work station. The hand truck 11 includes a pair of upper locking legs 12, as well as a pair of lower locking legs 13. The upper and lower locking legs 12, 13 are pivotally connected to the hand truck 11, and can be extended, which converts the hand truck 11 from a vertical transport configuration into a portable work station configuration.

The upper legs 12 are attached to the frame of the hand truck 11 below the handle 17. When not in use, the upper legs 12 are folded flat against the frame of the hand truck 11, below the planar surface of the work space 14. The upper legs 12 can be locked into position with a conventional locking mechanism that allows the upper legs 12 to be securely held against the hand truck 11 frame when the device is being used for transport, and can additionally support the weight of the hand truck 11, tool chest 15, and any other items stored thereon when in a horizontal work station configuration. Locking mechanisms that utilize a locking pin, pushbutton, or detent are contemplated.

The lower legs 13 can additionally be unfolded and locked into position for use as a horizontal work station. The lower legs 13 are pivotally attached to the base of the hand truck 11 and further include a hinge 18 for providing a sturdy support. The hinge 18 can include a joint in the middle thereof that allows the lower legs 13 to be folded against the frame of the hand truck 11 for transport, and extended and locked into position for use as a work station.

The upper and lower legs 12, 13 further include a telescoping means that enables the height of the work space 14 to be adjusted based on the height of the user. Each leg 12, 13 is capable of locking at a different selected position of extension. This allows for height adjustment of the entire work space 14, and additionally enables the user to level the device on an uneven surface. A locking means 19 is provided on each leg 12, 13 for holding the leg at the selected position of extension. In the preferred embodiment, the locking means 19 comprises an inner and outer leg section, with a plurality of apertures along the length thereof. A pushbutton passes through from the inner leg section to the outer leg section, thereby locking the leg into place.

The upper and lower legs 12, 13, enable the hand truck 11 to be converted from a transport configuration into a work station configuration. In operation, a user can extend the upper and lower legs 12, 13, and lock them into position. The telescoping means can be properly adjusted as desired. Next, the user can grasp the handle 17 and begin to tilt the device back and towards himself or herself until the tips 20 of the lower legs 13 make contact with the ground. The tips 20 are preferably covered with a high friction material, such as rubber, which prevents slipping as the device is maneuvered into position. Once the tips 20 of the lower legs 13 make contact with the ground, the user continues to tilt the handle 17 until the upper legs 12 make contact with the ground. Alternately, if two users are present, the upper legs 12 can be extended, and the device can be tilted until the upper legs 12 make contact with the ground. A first user can grasp the hand truck 11 near the tool chest 15, and lift the device off the ground, while the second user can extend each lower leg 13 and lock it into position.

Figure 3:
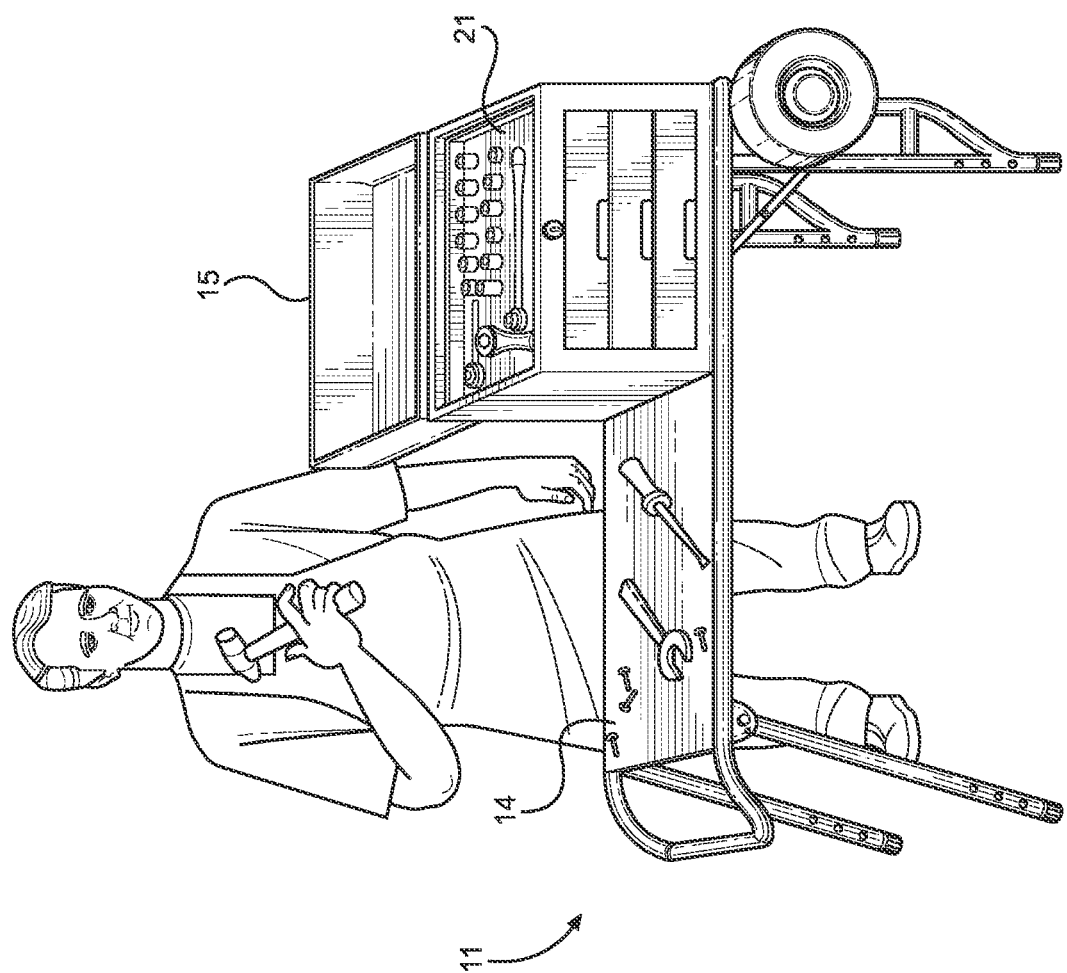
FIG. 3 shows a view of the present invention in use with the legs extended in order to provide a work station.

Referring now to FIG. 3, there is shown a view of the present invention in use with the legs extended in order to provide a work station. When placed horizontally, the work space 14 can be utilized for holding any tools, equipment, or work pieces required for a given task. The solid surface prevents small items from falling therethrough. The height of the device can be adjusted as needed, based on the height of the user and the grade of the surface the device is set on. In an alternate embodiment, the work space 14 can include a raised lip surrounding each side thereof, which prevents any items contained thereon from rolling off of the work space 14.

The tool chest 15 can be opened for access to the tools and equipment contained therein. The tool chest 15 includes a locking lid that prevents the device from inadvertently being opened when in transport. When in a transport configuration, the tool chest 15 is held vertically. As can be appreciated, any loose tools or equipment contained therein would be pushed to the base of the chest 15 due to gravity. To overcome such problems, the tool chest 15 includes a plurality of locking tool trays 21 that are each designed to secure the tools contained therein. The trays 21 lock the tools into position, thereby preventing the tools from shifting about when the tool chest 15 is transported vertically. The trays 21 can be removed from the chest 15 and replaced, enabling the user to customize the tools and equipment contained therein.

Figure 4:
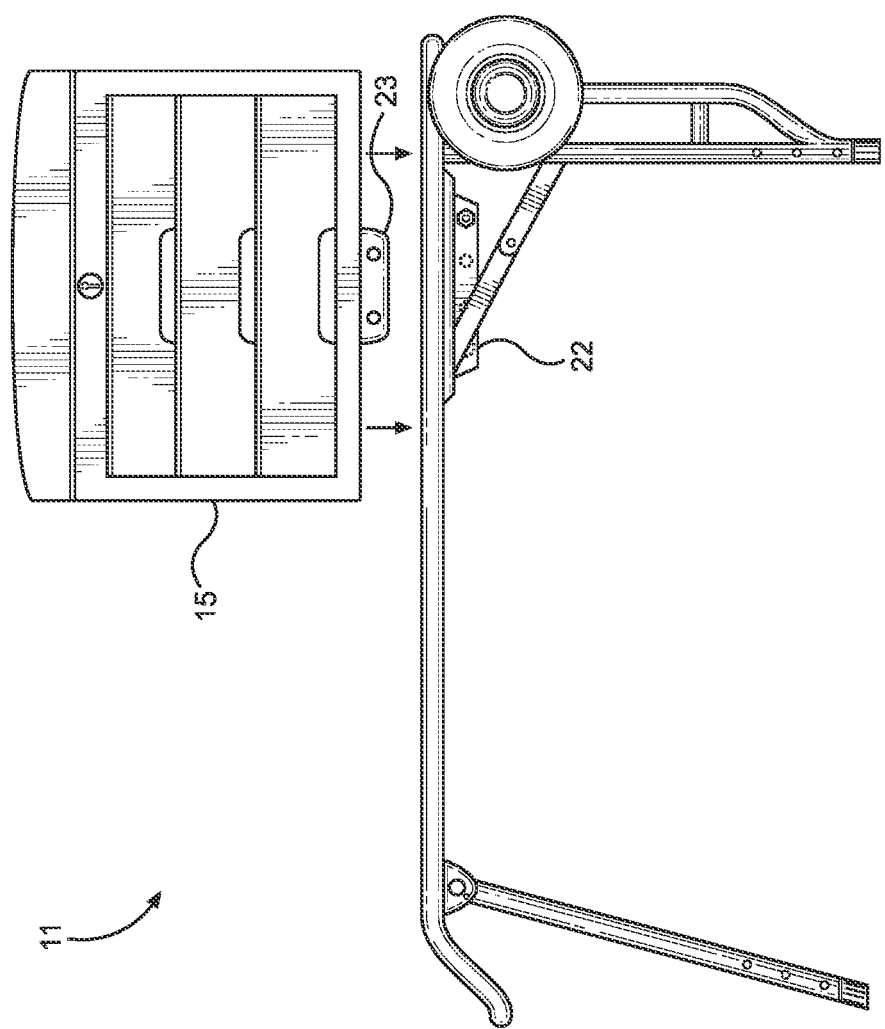
FIG. 4 shows a view of the attachment means between the tool chest and the hand truck.

Referring now to FIG. 4, there is shown a view of the attachment means between the tool chest and the hand truck. The tool chest 15 can be detachably removed from the hand truck 11 for portable use, and for replacement with other tool chests or storage containers. The tool chest 15 secures to the hand truck 11 with a locking means, which is comprised of a locking plate 22 that is attached to the frame of the hand truck 11. The base of the tool chest 15 includes a plate receiver 23 that aligns with the locking plate 22 on the base of the tool chest 15. The locking plate 22 and plate receiver 23 enable attachment and detachment thereof. A user can release the locking plate 22, and lift the tool chest 15 up and away from the hand truck 11. A variety of tool chests and storage devices with a lock can be utilized therewith. Devices designed for office supplies and equipment, electronic devices including a projector, speakers, and microphone, containers for sales and demonstrations, and storage containers for crafts and hobbies are contemplated. Said examples are provided for convenience by way of example, and should not be considered limiting.

Figure 5:
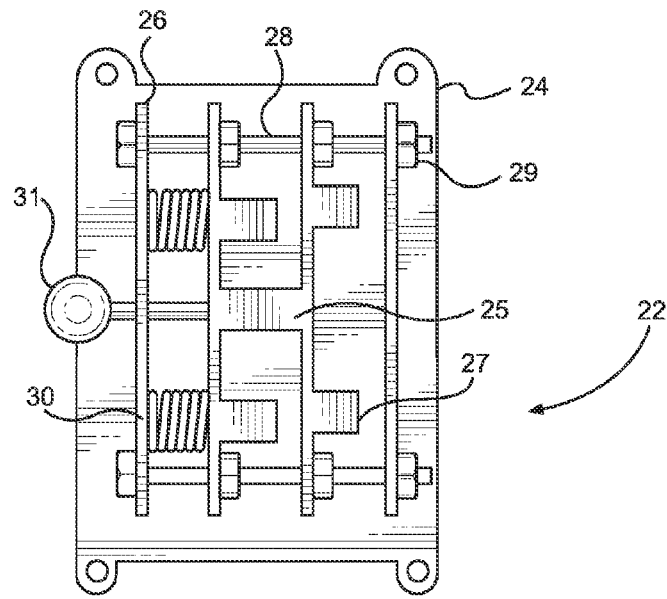
FIG. 5 shows a view of the locking plate on the base of the hand truck.

Referring now to FIG. 5 there is shown a view of the locking plate 22 on the base of the hand truck. The locking plate 22 comprises a plate 24 that is mounted to the hand truck, and includes a locking means. In the preferred embodiment, the locking means comprises a locking bar 25 that attaches to the plate 24 with a pair of rails 26 on either side thereof. The locking bar 25 includes at least one, but preferably two pairs of extension pins 27 that lock the tool chest to the plate receiver on the tool chest. The rails 26 include an aperture on the terminal ends thereof, which allow for a glide bolt 28 to pass therethrough. The glide bolts 28 enable attachment of the locking bar 25 to the rails 26, and are held in position with a plurality of lock nuts 29. The locking bar 25 can slidably move along the rails 26, and is kept under tension by a pair of springs 30 that push the locking bar 25 away from the springs 30. A handle 31 on the locking bar 25 can be used to slidably move the locking bar 25 along the glide bolts 28 for locking and unlocking the locking plate 22 from the plate receiver 23 on the tool chest.

Figure 6:
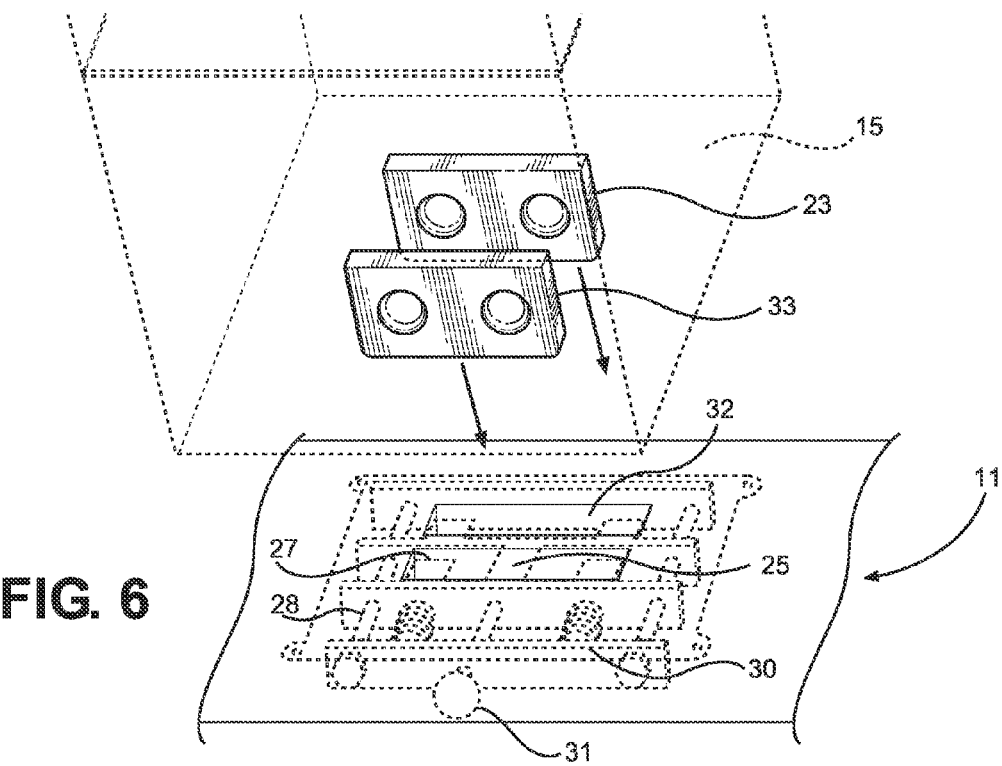
FIG. 6 shows a close-up perspective view of the attachment means between the tool chest and the hand truck.

Referring now to FIG. 6, there is shown a close-up perspective view of the attachment means between the tool chest 15 and the hand truck 11. To lock the tool chest 15 to the hand truck 11, the user can align the plate receiver 23 on the base of the tool chest 15 with the aperture 32 in the hand truck 11. The tool chest 15 can rest thereon, but will be prevented from locking into place due to the position of the extension pins 27. The tension placed on the locking bar 25 by the springs 30 covers over a portion of the aperture 32, and prevents the plate receiver 23 from fitting therethrough. To lock the tool chest 15 into position, a user can pull the handle 31 away from the springs 30, which causes the locking bar 25 to slide along the glide bolts 28. This causes the extension pins 27 to move away from the aperture 32, creating space for the plate receiver 23 to slide therethrough. This causes the base of the tool chest 15 to mate with the hand truck 11. When the user releases the handle 31, the extension pins 27 fit through the pin extension receivers 33 in the plate receiver 23, which locks the tool chest 15 into position. To release the tool chest 15, the user can pull the handle 31 away from the springs 30, causing the locking bar 25 to slide along the glide bolts 28, which releases the extension pins 27 from the pin extension receivers 33. The user can then lift the tool chest 15 from the hand truck 11.

Figure 7:
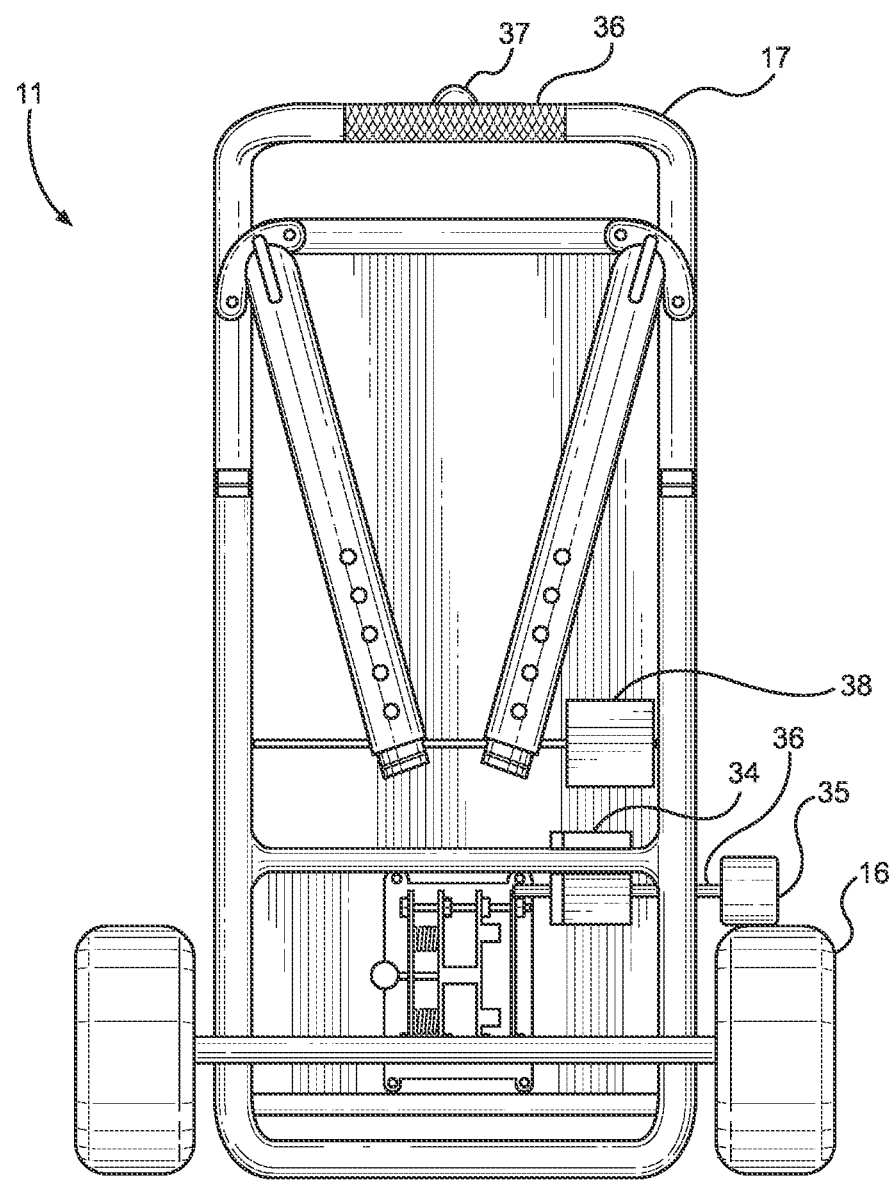
FIG. 7 shows an underside view of the present invention with a power assist embodiment.

Referring now to FIG. 7, there is shown an underside view of the present invention with a power assist embodiment. This view shows an alternate embodiment, whereby the present invention can include a power assist motor 34 attached to the frame of the hand truck 11, which can assist with the moving of large loads. The motor 34 is attached to the base of the hand truck 11, and includes a small powered wheel 35 that attaches to the shaft of the motor 34. The small powered wheel 35 makes direct contact with the wheel 16, such that rotation of the motor 34 causes rotation of the shaft 36 and small powered wheel 35, which turns the wheel 16. The motor 34 and small powered wheel 35 are operated with a throttle 36 that is attached to the handle 17. A thumb control 37 on the throttle 36 controls the speed of the motor 34. The wheels 16 can rotate freely without the use of the motor 34, saving energy when power assistance is not required. The power assistance is particularly suited to transporting large items on the hand truck 11 up an inclined surface. The user can transport the hand truck 11 and payload manually along a flat or decline surface, and activate the power assistance for traveling up an inclined surface.

The wires connecting the throttle 36 to the motor 34 are preferably routed through the frame of the hand truck 11. The motor 34 is powered by a battery 38 that is secured to the hand truck 11 frame. The battery 38 is preferably a conventional rechargeable battery that is well understood in the art, and can be recharged between uses. The device can further include a power inverter. The power inverter can be attached to the battery 38, and used to power small devices requiring a power source.

The hand truck can be readily fabricated from a variety of materials. In the preferred embodiment, the frame is constructed from tube steel, aluminum tube, aluminum extrusion, or high impact plastics, thereby providing a rugged and light weight design that facilitates ease of transport.

Overall, the present invention provides a user with the convenience of a portable work area, along with optional storage and the ability to transport tools and supplies. The device can be utilized by people who require the mobility of a small workbench or even a portable desk. The present invention can transform from a toolbox for auto technicians to a storage bin for hobbyists for their small tools and parts, allowing them to not only have tools and supplies at-hand, but to also have a solid, flat area to work. These features can prevent aches and pains associated with working in a bent-over position. The storage area can include a variety of drawers with a locking function to safely protect the tools and equipment while they are in transit. The locking legs can be placed on the back bottom and back top of the device, allowing it to become a small workbench.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combination portable tool chest and work station, comprising:

a hand truck, said hand truck comprising a frame having an upper end, a lower end, a top surface, and a bottom surface, a handle attached to said upper end, a pair of wheels connected at said lower end, a work surface permanently affixed to said top surface of said frame, telescopic upper locking legs and telescopic lower locking legs being pivotally connected to said frame, wherein said telescopic upper locking legs and said telescopic lower locking legs can be pivotally extended to convert said hand truck from a vertical transport configuration into a portable work station configuration; and a tool chest having sidewalls, a bottom, and a top defining an interior area, a lid disposed over said top of said tool chest, a plurality of drawers positioned within said sidewalls and extending into said interior area, and being removably attached to said hand truck.

2. The device of claim 1, wherein said work surface is positioned between said handle and said tool chest, providing a planar surface when said hand truck is converted into a work station.

3. The device of claim 1, wherein said telescopic upper locking legs are pivotally attached to said frame below said handle and can fold flat against said hand truck.

4. The device of claim 1, wherein said telescopic upper locking legs can be locked into position with a conventional locking mechanism that allows said telescopic upper locking legs to be securely held against said frame when being used for transport, and can additionally support the weight of said hand truck and said tool chest when in a horizontal work station configuration.

5. The device of claim 1, wherein said telescopic lower locking legs are pivotally attached to said bottom surface of said frame;
said telescopic lower locking legs having a straight portion and a curved portion joined at a tip.

6. The device of claim 1, wherein said telescopic lower locking legs further comprise a hinge having a joint in the middle thereof that allows said telescopic lower locking legs to be folded against said frame of said hand truck for transport, and extended and locked into position for use as a work station.

7. The device of claim 1, wherein said telescoping means further comprises a locking means on each of said telescopic upper locking legs and said telescopic lower locking legs for holding each of said telescopic upper locking legs and said telescopic lower locking legs at a selected position of extension.

8. The device of claim 1, wherein each of said telescopic upper locking legs and said telescopic lower locking legs further comprises tips that are covered with a high friction material to prevent slipping as the device is maneuvered into position.

9. The device of claim 1, wherein said lid further comprises a lock.

10. The device of claim 1, wherein said tool chest further comprises a plurality of locking tool trays that are removably attached to said tool chest and are designed to secure tools contained therein.

11. The device of claim 1, wherein said hand truck further comprises a locking plate for removably attaching said tool chest thereto.

12. The device of claim 11, wherein said locking plate comprises a locking bar, said locking bar having at least one pair of locking pin extensions and a handle connected to said locking bar.

13. The device of claim 1, wherein said hand truck further comprises a power assist motor attached to said frame.

14. The device of claim 13, wherein said power assist motor further comprises a powered wheel that attaches to a shaft of said power assist motor, said powered wheel making direct contact with said pair of wheels of said hand truck, such that rotation of said power assist motor causes rotation of said shaft and said powered wheel.

15. The device of claim 13, wherein said power assist motor is operated with a throttle that is attached to said handle of said hand truck.

16. The device of claim 13, wherein said power assist motor is powered by a rechargeable battery that is secured to said frame.

17. A combination portable tool chest and work station, comprising:
a hand truck, said hand truck comprising a frame having an upper end, a lower end, a top surface, and a bottom surface, a handle attached to said upper end, a pair of wheels connected at said lower end, a work surface permanently affixed to said top surface of said frame, an upper and lower locking legs being pivotally connected to said frame, a locking plate attached to said frame,
said locking plate comprising a locking bar, said locking bar having at least one pair of locking pin extensions and a handle connected to said locking bar, wherein said locking bar attaches to said locking plate by means of a pair of guide bolts that extend through said locking bar and a pair of rails disposed on said locking plate, wherein said locking bar is held under tension by means of a pair of springs;
a tool chest having sidewalls, a bottom, and a top defining an interior area, a lid disposed over said top of said tool chest, a plurality of drawers positioned within said sidewalls and extending into said interior area, and being removably attached to said hand truck.

18. The device of claim 17, wherein said tool chest is removably attached to said hand truck locking plate with a plate receiver, said plate receiver comprising at least one aperture for receiving said locking pin extension.

* * * * *